United States Patent [19]

Nozaki et al.

[11] Patent Number: 4,778,991

[45] Date of Patent: Oct. 18, 1988

[54] LIGHT BEAM SCANNING READ-OUT APPARATUS AND RECORDING APPARATUS

[75] Inventors: Nobuharu Nozaki, Kaisei; Hiroshi Nishihara, Toyonaka; Toshiaki Suhara, Suita, all of Japan

[73] Assignee: Fuji Photo Film Co., Ltd., Japan

[21] Appl. No.: 912,062

[22] Filed: Sep. 26, 1986

[30] Foreign Application Priority Data

Sep. 30, 1985 [JP] Japan ............................ 60-217725
Sep. 30, 1985 [JP] Japan ............................ 60-217726

[51] Int. Cl.$^4$ .................................................. G02F 1/11
[52] U.S. Cl. ......................................... 250/235; 350/358
[58] Field of Search ............... 250/234, 235; 350/358; 358/201, 235, 293, 294

[56] References Cited

U.S. PATENT DOCUMENTS

| | | | |
|---|---|---|---|
| 3,676,592 | 7/1972 | Foster | 350/358 |
| 3,851,951 | 12/1974 | Eveleth | 358/201 |
| 4,093,976 | 6/1978 | Das | 350/358 |
| 4,455,485 | 6/1984 | Hosaka et al. | 350/358 |
| 4,523,803 | 6/1985 | Arao et al. | 350/358 |
| 4,693,548 | 9/1987 | Tsunoi | 350/358 |

Primary Examiner—David C. Nelms
Assistant Examiner—Stephone B. Allen
Attorney, Agent, or Firm—Gerald J. Ferguson, Jr.

[57] ABSTRACT

A light beam scanning read-out apparatus and a light beam scanning recording apparatus comprise an optical system for converting light guided inside of an optical waveguide into collimated optical wave, a device for generating surface acoustic waves which deflect the guided optical wave, a drive circuit for operating the surface acoustic wave generating device so that the frequency of the surface acoustic waves changes continuously, and a focusing grating coupler for converging the guided and deflected optical wave at a space outside of the optical waveguide. The read-out apparatus further comprises a sub-scanning device for moving a read-out original exposed to the converted light with respect to the optical waveguide, and a photodetector for detecting light obtained from the read-out original. The recording apparatus further comprises a sub-scanning device for moving a light-sensitive material exposed to the converged light with respect to the optical waveguide, and a modulator for modulating the guided optical wave with an image signal.

6 Claims, 4 Drawing Sheets

LIGHT BEAM SCANNING READ-OUT APPARATUS AND RECORDING APPARATUS

BACKGROUND OF THE INVENTION

1. Field of the Invention

This invention relates to a light beam scanning read-out apparatus and a light beam scanning recording apparatus. This invention particularly relates to a light beam scanning read-out apparatus and a light beam scanning recording apparatus wherein light beam scanning is conducted by generating surface acoustic waves in an optical waveguide and deflecting the guided optical wave by the diffracting action of the surface acoustic waves.

2. Description of the Prior Art

There have heretofore been used widely light beam scanning read-out apparatuses wherein an image recorded on a read-out original is read out by scanning the read-out original with a light beam and photoelectrically detecting light transmitting through the read-out original, light reflected thereby, or light emitted thereby, and light beam scanning recording apparatuses for scanning a light-sensitive material with a light beam and recording a continuous tone or black-and-white two-valued image on the light-sensitive material. As the light beam scanning apparatuses for one-dimensionally scanning the reading light beam or the recording light beam in the light beam scanning read-out apparatuses and the light beam scanning recording apparatuses, those as described below are known.

(1) Apparatuses wherein the light beam is deflected and scanned by a mechanical type light deflector such as a galvanometer mirror or a polygon mirror (multiface rotating mirror).

(2) Apparatuses wherein the light beam is deflected and scanned by a light deflector using solid-state light deflecting device, such as an EOD (electro-optic deflector) or an AOD (acousto-optic deflector).

(3) Apparatuses wherein a shutter array such as a liquid crystal device array or a PLZT array is combined with a linear light source, and the shutter devices of the shutter array are independently connected to drive circuits and turned on and off in accordance with an image signal to conduct linear sequential scanning.

(4) Apparatuses wherein many light emitting devices such as LEDs are arrayed in a line, independently connected to drive circuits, and turned on and off in accordance with an image signal to carry out linear sequential scanning.

The light beam scanning apparatuses described in (1) have the drawbacks that the mechanical type light deflector is easily affected by vibration, exhibits low mechanical durability, and requires troublesome adjustments. Further, a large optical system is necessary for swinging and deflecting the light beam, and the read-out apparatuses and the recording apparatuses become large.

The light beam scanning apparatuses described in (2) and using the EOD or AOD have the same drawback that the apparatuses for swinging and deflecting the light beam become large. Particularly, since the light deflection angle cannot be adjusted to be large with the EOD and the AOD, the optical system becomes larger than in the case where the mechanical light deflector is used as described in (1).

In the light beam scanning apparatuses using the shutter array as described in (3), since two polarizing plates must be used, the light utilization efficiency of the light source is very low.

The light beam scanning apparatuses using many light emitting devices arrayed in a line as described in (4) have the drawback that, since fluctuations arise in light emission intensity among the light emitting devices, the apparatuses are not suitable for accurate scanning.

Accordingly, it has been proposed to constitute a light beam scanning apparatus so that guided optical wave advancing inside of an optical waveguide is deflected by surface acoustic waves (SAW), and a light beam is scanned by changing the angle of deflection. The light beam scanning apparatus comprises:

(i) an optical waveguide formed of a material allowing propagation of surface acoustic waves therethrough, (ii) a light source for emitting light into said optical waveguide, (iii) an optical system for converting the guided optical wave advancing inside of the optical waveguide into collimated optical guided wave, (iv) a means for generating the surface acoustic waves, which advance in a direction intersecting the optical path of the guided optical wave and deflect the guided optical wave, in the optical waveguide, and (v) a drive circuit for operating the surface acoustic wave generating means so that it generates the surface acoustic waves the frequency of which changes continuously. The light beam scanning read-out apparatus and the light beam scanning recording apparatus wherein said light beam scanning apparatus is used exhibit high durability, high resistance to vibration and a high light utilization efficiency, are easy to adjust and suitable for accurate scanning, and can be made small to some extent.

However, in the light beam scanning read-out apparatus and the light beam scanning recording apparatus wherein the aforesaid light beam scanning apparatus is used, since an optical device such as a prism coupler is provided for emitting the guided and deflected optical wave out of the optical waveguide and a converging lens is provided for converging the scanning light, which is emitted out of the optical waveguide, on a read-out original or a light-sensitive material, the sizes of the read-out apparatus and the recording apparatus cannot be made substantially small. Also, deflection of the guided optical wave is caused by Bragg diffraction from the acousto-optic interaction between the guided optical wave and the surface acoustic waves. However, in such light deflection, the deflection angle cannot be adjusted to be large, and therefore the distance between the optical waveguide and the read-out original or the light-sensitive material must be adjusted to be long in order to adjust the light beam scanning width to a large value. As a result, the light beam scanning read-out apparatus and the light beam scanning recording apparatus become large.

Also, in the case where the prism coupler is used, the gap between the prism bottom surface and the optical waveguide must be adjusted accurately, and an expensive fine adjustment mechanism is required for this purpose. The prism coupler is also expensive. Therefore, the light beam scanning read-out apparatus and the light beam scanning recording apparatus become expensive.

Further, besides the aforesaid adjustment work, accurate adjustment of the position of the converging lens with respect to the position of the optical waveguide is necessary. Thus the light beam scanning read-out apparatus and the light beam scanning recording apparatus wherein the aforesaid light beam scanning apparatus is used require very troublesome adjustments. Also, since many adjustments are necessary, the reliability of the light beam scanning read-out apparatus and the light beam scanning recording apparatus of this type is low.

Also, when the guided optical wave is emitted out of the optical waveguide by use of the prism coupler, in shape the emitted light becomes a parallel group of rays in a direction parallel to the prism bottom ridge and becomes a divergent group of rays in a direction normal thereto. Therefore, in order to converge the scanning light into a circular spot, it is necessary to use a special converging lens instead of ordinary spherical lenses.

Further, in the case where the prism coupler and the converging lens are used, when a defect arises with these optical devices or the end face of the optical waveguide, the shape of the scanning light beam spot is adversely affected. Particularly, in the case where the guided optical wave is emitted out of the end face of the optical waveguide, a defect at the end face directly leads to a defect of the scanning light beam spot, and it thus becomes impossible to achieve accurate scanning.

SUMMARY OF THE INVENTION

The primary object of the present invention is to provide a light beam scanning read-out apparatus which eliminates the aforesaid drawbacks of the conventional light beam scanning read-out apparatuses.

Another object of the present invention is to provide a light beam scanning recording apparatus which eliminates the aforesaid drawbacks of the conventional light beam scanning recording apparatuses.

The present invention provides a light beam scanning read-out apparatus which comprises:

(i) an optical waveguide formed of a material allowing propagation of surface acoustic waves therethrough, (ii) a light source for emitting light into said optical waveguide, (iii) an optical system for converting the guided optical wave advancing inside of said optical waveguide into collimated optical guided wave, (iv) a means for generating the surface acoustic waves, which advance in a direction intersecting an optical path of said guided optical wave and deflect said guided optical wave, in said optical waveguide, (v) a drive circuit for operating said surface acoustic wave generating means so that said means generates the surface acoustic waves the frequency of which changes continuously, (vi) a focusing grating coupler (FGC) formed on a surface of said optical waveguide for emitting said guided and deflected optical wave out of said optical waveguide and converging it at a space outside of said optical waveguide, (vii) a sub-scanning means for moving a read-out original, which is positioned so that said converged light impinges upon said read-out original, with respect to said optical waveguide in a direction approximately normal to the scanning direction of said light by said deflection, and (viii) a photodetector for photoelectrically detecting light transmitting through said read-out original, light reflected by said read-out original, or light emitted by said read-out original when said converged light impinges upon said read-out original.

In another aspect of the present invention, the aforesaid light beam scanning read-out apparatus further comprises a glass block provided with a light reflecting layer at each of two surfaces facing each other and joined with a substrate of said optical waveguide so that said light emitted out of said optical waveguide is reflected repeatedly between said two surfaces before said light arrives at the position of said converging.

The present invention further provides a light beam scanning recording apparatus which comprises:

(i) an optical waveguide formed of a material allowing propagation of surface acoustic waves therethrough, (ii) a light source for emitting light into said optical waveguide, (iii) an optical system for converting the guided optical wave advancing inside of said optical waveguide into collimated optical guided wave, (iv) a means for generating the surface acoustic waves, which advance in a direction intersecting an optical path of said guided optical wave and deflect said guided optical wave, in said optical waveguide, (v) a drive circuit for operating said surface acoustic wave generating means so that said means generates the surface acoustic waves the frequency of which changes continuously, (vi) a focusing grating coupler formed on a surface of said optical waveguide for emitting said guided and deflected optical wave out of said optical waveguide and converging it at a space outside of said optical waveguide, (vii) a sub-scanning means for moving a light-sensitive material, which is positioned so that said converged light impinges upon said light-sensitive material, with respect to said optical waveguide in a direction approximately normal to the scanning direction of said light by said deflection, and (viii) a modulation means for modulating said guided optical wave in accordance with an image signal.

In a further aspect of the present invention, the aforesaid light beam scanning recording apparatus further comprises the glass block as mentioned above.

In the present invention, since light beam scanning is carried out with a simple light beam scanning section having no mechanical operating section, the light beam scanning read-out apparatus and the light beam scanning recording apparatus exhibit high durability and high resistance to vibration. Also, since it is unnecessary to use a prism coupler for emitting the guided optical wave out of the optical waveguide and a converging lens for converging the scanning light, the apparatuses are easy to adjust and can be fabricated very small at a low cost.

Particularly, in the light beam scanning read-out apparatus and the light beam scanning recording apparatus comprising the glass block, since a turn-back optical path is formed inside the glass block, it is possible to position the light beam scanning section close to the read-out original or the light-sensitive material even though the main scanning width is relatively long, and to make the size of the apparatus markedly small.

In the light beam scanning recording apparatus of the present invention, since light beam scanning is conducted by use of a single light source, the problem of fluctuations in light emission intensity of the light source as in the case of the LED array or the like does not arise, and it is possible to conduct scanning accurately and to improve the light utilization efficiency of the light source.

Also, in the light beam scanning read-out apparatus and the light beam scanning recording apparatus of the present invention, since the focusing grating coupler having redundancy is used for emitting the guided optical wave out of the optical waveguide and converging it, the shape of the converged beam spot is not affected even though the diffraction grating section may be defective to some extent. Thus it is possible always to conduct image read-out or image recording accurately with a beam spot of a predetermined shape.

Though already known, deflection of the guided optical wave by the surface acoustic waves will briefly be described below. As shown in FIGS. 1 and 7, surface acoustic waves 12 are generated, for example, by an interdigital transducer (IDT) 15 and propagated inside of an optical waveguide 11. The deflection angle δ of the guided optical wave 13 based on the aforesaid acousto-optic interaction is expressed as $\delta = 2\theta$ wherein $\theta$ denotes the angle (Bragg angle) between the direction of advance of the surface acoustic waves 12 and the direction of advance of the guided optical wave 13. Also, there holds the formula $$2\theta = 2\sin^{-1}(\lambda/2Ne \cdot \Lambda)$$
$$\simeq \lambda/Ne \cdot \Lambda$$
$$= \lambda \cdot f/Ne \cdot v$$

wherein λ and Ne respectively denote the wavelength and the effective refractive index of the guided optical wave 13, and Λ, f and v respectively denote the wavelength, the frequency and the velocity of the surface acoustic waves 12. Thus $2\theta$ and $\delta$ are approximately proportional to the frequency f of the surface acoustic waves 12. When the frequency of the pulsewise voltage applied to the interdigital transducer 15 is changed continuously to continuously change the frequency of the surface acoustic waves 12, the deflection angle δ changes continuously. Accordingly, when the guided optical wave 13 thus deflected is taken out of the optical waveguide 11, the light scans one-dimensionally.

On the other hand, the focusing grating coupler 14 is a diffraction grating having a curvature and "chirp" and directly couples the plane waves inside of the optical waveguide 11 with the spherical waves having the focal point at a single point in the space outside of the optical waveguide 11. Therefore, when the focusing grating coupler 14 is provided on the surface of the optical waveguide 11 in the optical path of the guided optical wave 13 deflected as mentioned above, the deflected light is taken out of the optical waveguide 11 and converged in the space outside of the optical waveguide 11. When a read-out original 31 or a light-sensitive material 31 is provided at the converging position of said light, the read-out original 31 or the light-sensitive material 31 is one-dimensionally scanned by a converged circular beam spot. The aforesaid focusing grating coupler is described in detail in, for example, Technical Research Report MW83-88, The Institute of Electronics and Communication Engineers of Japan, pages 47 to 54.

DESCRIPTION OF THE PREFERRED EMBODIMENTS

The present invention will hereinbelow be described in further detail with reference to the accompanying drawings.

Figure 1:
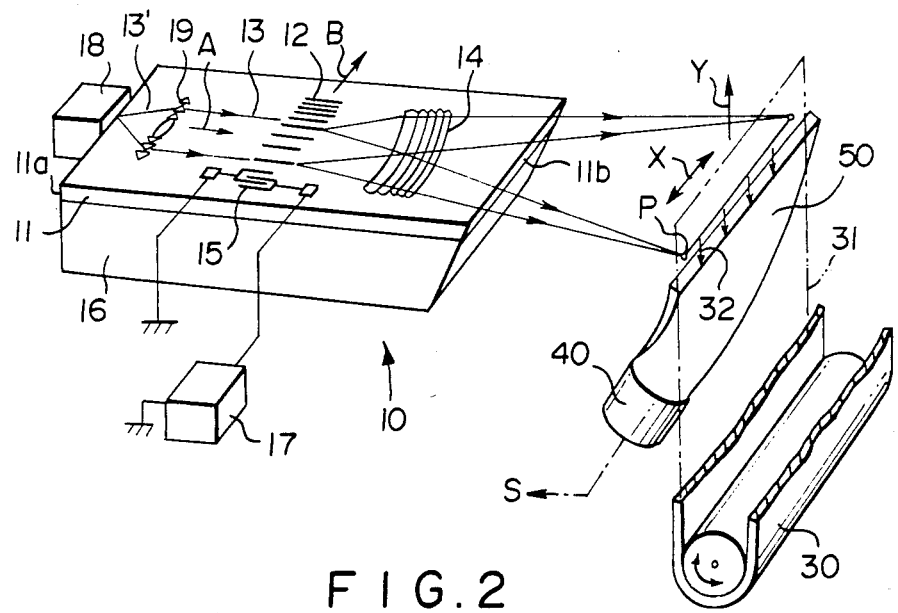
FIGS. 1 and 2 are a schematic perspective view and a side view showing an embodiment of the light beam scanning read-out apparatus in accordance with the present invention.
Figure 2:
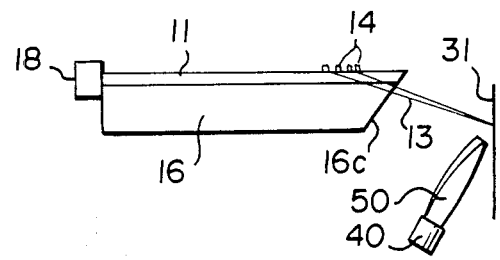

Referring to FIGS. 1 and 2, the light beam scanning read-out apparatus is provided with a light beam scanning section 10, an endless belt device 30 acting as a sub-scanning means, a photomultiplier 40 acting as a photodetector, and a light guide member 50 closely contacted with a light receiving face of the photomultiplier 40. First, the light beam scanning section 10 will be described in detail below. The light beam scanning section 10 comprises an elongated substrate 16, the optical waveguide 11 formed on the substrate 16, the interdigital transducer 15 provided at a side end portion of the optical waveguide 11, a drive circuit 17 for applying a pulsewise voltage to the interdigital transducer 15, and a semiconductor laser 18 directly coupled with an end face 11a of the optical waveguide 11, i.e. the end face thereof on the side opposite to the endless belt device 30. An optical waveguide lens 19 is positioned in the optical waveguide 11 at a position near the end face 11a. The focusing grating coupler 14 having a curvature and "chirp" is positioned on the surface of the optical waveguide 11 in the vicinity of an end face 11b opposite to the end face 11a.

In this embodiment, by way of example, the substrate 16 is formed of a LiNbO$_3$ wafer, and the optical waveguide 11 is formed by overlaying a Ti diffused film on the surface of the wafer. As the substrate 16, it is also possible to use a crystal substrate formed of sapphire, Si or the like. The optical waveguide 11 may also be formed by sputtering or depositing a different material onto the surface of the substrate 16. Various optical waveguides are described in detail in, for example, T. Tamir, "Integrated Optics", Topics in Applied Physics, Vol. 7, Springer-Verlag, 1975, and Nishibara, et al., "Integrated Optical Circuit", Ohm, 1985. In the present invention, any of the known optical waveguides may be used as the optical waveguide 11. However, the optical waveguide 11 must be formed of a material such as the Ti diffused film which allows propagation of the surface acoustic waves. The optical waveguide 11 may also be constituted by two or more layers.

In this embodiment, an optical waveguide lens 19 is constituted, for example, by a proton exchange type optical waveguide Fresnel lens. The optical waveguide lens 19 of this type may be formed by depositing a SiNx film on the surface of the optical waveguide 11, coating a positive type electron beam resist onto the surface of the SiNx film, depositing a thin Au conductive film onto the positive type electron beam resist, drawing a Fresnel lens pattern with an electron beam, obtaining a resist pattern by removal of the thin Au film and development, transferring the resist pattern to the SiNx film by ion etching, removing the resist, and then conducting proton exchange by a known method. The focusing grating coupler 14 may be formed, for example, by coating a negative type electron beam resist onto the surface of the SiNx film after the formation of the optical waveguide lens 19, depositing a thin Au conductive film onto the negative type electron beam resist, drawing a diffraction grating pattern with an electron beam, and thereafter conducting the aforesaid steps from the removal of the thin Au film to the removal of the resist. The interdigital transducer 15 may be formed, for example, by coating a positive type electron beam resist onto the surface of the optical waveguide 11, depositing a thin Au conductive film onto the positive type electron beam resist, drawing a transducer pattern with an electron beam, removing the thin Au film, conducting development, depositing a thin Cr film and a thin Al film, and then conducting lift-off in an organic solvent.

In the case where the substrate 16 and the optical waveguide 11 are made of a piezo-electric material, the surface acoustic waves 12 may be generated also when the interdigital transducer 15 is directly positioned inside of the optical waveguide 11 or on the substrate 16. In other cases, a piezo-electric thin film of ZnO or the like may be formed at a part of the substrate 16 or the optical waveguide 11 by deposition, sputtering, or the like, and the interdigital transducer 15 may be positioned at the piezo-electric thin film.

The semiconductor laser 18 emits a laser beam 13' so that it enters the optical waveguide 11 from its end face (light input face) 11a. The laser beam 13' is converted into a laser beam 13 of collimated optical wave by the optical waveguide lens 19. The laser beam 13 advances in the guided mode in the direction as indicated by the arrow A inside of the optical waveguide 11. Instead of directly securing the semiconductor laser 18 to the light input face 11a, the laser beam 13' may be made to enter the optical waveguide 11 via a lens, a coupler prism, a grating coupler or the like. In the case where the grating coupler is used and provided as the focusing grating coupler formed on the surface of the optical waveguide 11, it is possible to convert the laser beam 13' incident upon the optical waveguide 11 into the laser beam of collimated optiaal (guided) wave and to omit the optical waveguide lens 19. However, when the semiconductor laser 18 is directly secured to the light input face 11a and the optical waveguide lens 19 is used for converting the divergent wave 13' into the collimated wave 13, it becomes possible to make the light beam scanning section 10 very small and reliable. The light source for emitting the scanning light is not limited to the semiconductor laser 18, and may be a gas laser, a solid laser or the like.

When read-out from a read-out original 31 is conducted with the light beam scanning read-out apparatus having the configuration as mentioned above, the read-out original 31 is conveyed by the endless belt device 30 in the direction as indicated by the arrow Y. The semiconductor laser 18 is operated to emit the laser beam 13', and at the same time a pulsewise voltage the frequency of which changes continuously is applied from a drive circuit 17 to the interdigital transducer 15. As the voltage is thus applied to the interdigital transducer 15, the surface acoustic waves 12 advance along the surface of the optical waveguide 11 in the direction as indicated by the arrow B in FIG. 1. The interdigital transducer 15 is provided so that the surface acoustic waves 12 advance in a direction intersecting the optical path of the guided optical wave 13 (the collimated optical (guided) wave). Therefore, the guided optical wave 13 is deflected by the surface acoustic waves 12 as mentioned above when it advances across the surface acoustic waves 12. Since the voltage is applied as described above to the interdigital transducer 15, the frequency of the surface acoustic waves 12 changes continuously, and consequently the deflection angle of the guided optical wave 13 changes continuously. As shown in FIG. 2, the guided optical wave 13 thus deflected is diffracted toward the substrate 16 by the focusing grating coupler 14 having a curvature and "chirp", and emitted out of the optical waveguide 11. Thus the guided optical wave 13 passes through the substrate 16 and is emitted out of the substrate 16 from an obliquely cut end face 16c. Also, by the action of the focusing grating coupler 14, the guided optical wave 13 is converged into a circular spot P in a space outside of the optical waveguide 11. Since the deflection angle of the guided optical wave 13 changes continuously as mentioned above, the beam spot P scans one-dimensionally in the direction as indicated by the arrow X in FIG. 1. Accordingly, when the read-out original 31 is provided at the position exposed to the beam spot P and moved in the sub-scanning direction as indicated by the arrow Y approximately normal to the direction X of the aforesaid scanning (main scanning), the read-out original 31 is two-dimensionally scanned by the beam spot P.

The read-out original 31 may, for example, be a stimulable phosphor sheet as disclosed in U.S. Pat. Nos. 4,258,264 and 4,387,428. The stimulable phosphor sheet 31 is exposed in advance to a radiation passing through an object to have a radiation image of the object stored thereon. As shown in FIG. 1, when the stimulable phosphor sheet 31 carrying the radiation image stored thereon is exposed to the beam spot P (light 13) as mentioned above, light 32 is emitted by the exposed portion of the stimulable phosphor sheet 31 in proportion to the radiation energy stored. The emitted light 32 is guided inside of the light guide member 50 and photoelectrically detected by the photomultiplier 40. The output signal (read-out image signal) S of the photomultiplier 40 is processed and sent to an image reproducing apparatus (not shown) for use in reproduction of the radiation image.

Figure 3:
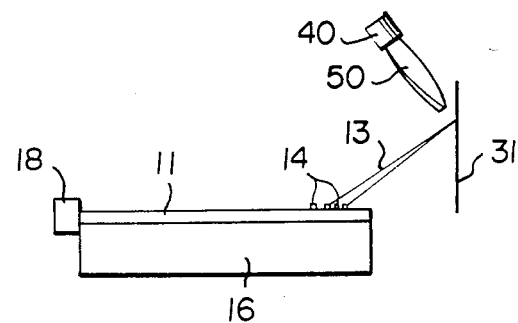
FIG. 3 is a schematic side view showing a modified form of the embodiment of the light beam scanning read-out apparatus shown in FIG. 1, FIGS. 4 and 5 are a schematic perspective view and a side view showing another embodiment of the light beam scanning read-out apparatus in accordance with the present invention.

In the aforesaid embodiment, the guided optical wave 13 is diffracted toward the substrate 16 by the focusing grating coupler 14. However, as shown in FIG. 3, the focusing grating coupler 14 may be constituted so that the guided optical wave 13 is diffracted thereby to the side opposite to the substrate 16 and emitted directly into the ambient space. Also, in the case where a long main scanning width is required, a plurality of the light scanning mechanism having the aforesaid configuration may be arrayed on the same substrate, and the scanning lines formed by a plurality of the scanning beams may be combined to constitute a single main scanning line.

Figure 4:
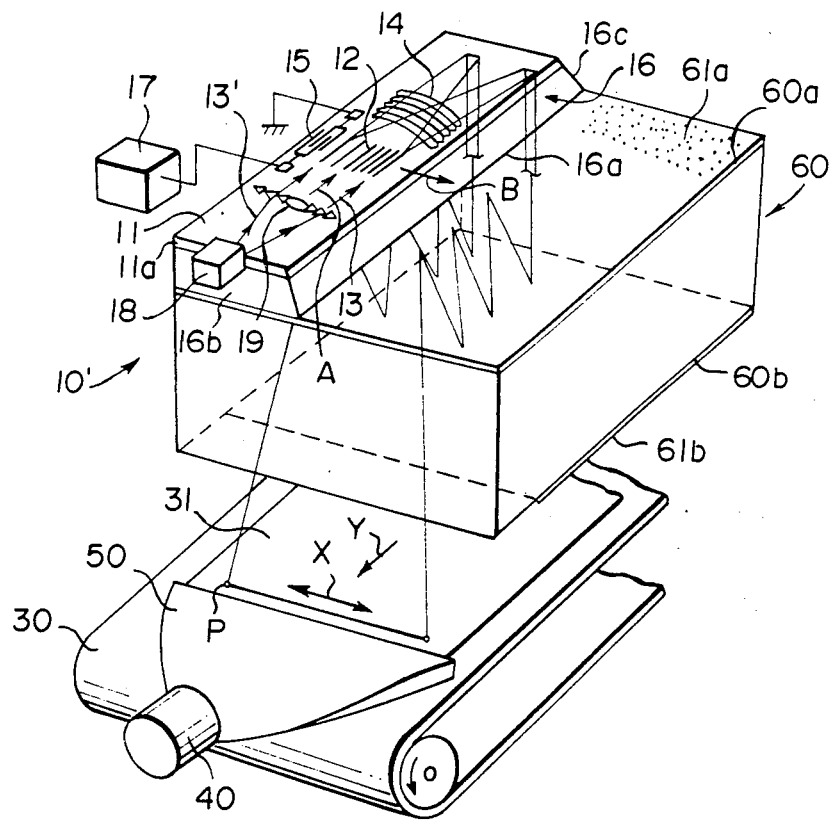
Figure 5:
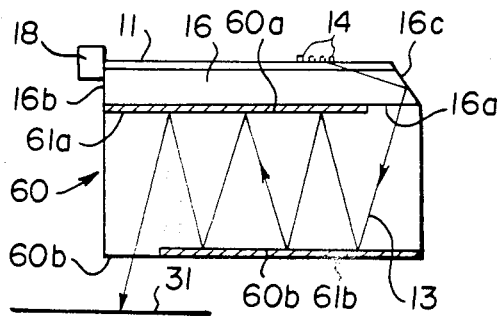

Another embodiment of the light beam scanning read-out apparatus will hereinbelow be described with reference to FIGS. 4 and 5. In FIGS. 4 and 5, similar elements are numbered with the same reference numerals with respect to FIGS. 1 and 2. In a light beam scanning section 10' of this embodiment, a glass block 60 is joined to a bottom surface 16a of the substrate 16. The glass block 60 is provided with light reflecting layers 61a and 61b respectively positioned on a surface 60a on the side joined to the substrate 16 and a surface 60b facing the surface 60a. The light reflecting layers 61a and 61b may be constituted, for example, by a deposition mirror. The focusing grating coupler 14 is constituted so that the first-order diffracted light component of the guided optical wave 13 is diffracted toward the substrate 16. The end face 16c of the substrate 16 opposite to the end face 16b on the side where the semiconductor laser 18 is mounted is formed obliquely to face up. Therefore, the diffracted light 13 is totally reflected by the end face 16c and enters the glass block 60. The oblique cutting angle of the end face 16c is adjusted to such a value as to achieve total reflection. Also, the portion of the surface 60a of the glass block 60 where the diffracted light 13 enters the glass block 60 is not provided with the light reflecting layer 61a.

The light 13 entering the glass block 60 is repeatedly reflected between the light reflecting layers 61a and 61b standing face to face with each other, and emitted out of the glass block 60 from a portion of the surface 60b where the light reflecting layer 61b is not provided. Therefore, when the read-out original 31 is provided at the position exposed to the converged beam spot P formed by the light 13 emitted out of the glass block 60 and moved in the sub-scanning direction as mentioned above, the read-out original 31 is two-dimensionally scanned by the beam spot P.

In the embodiment of FIG. 4, since the turn-back optical path of the scanning light is formed inside of the glass block 60, even though the light beam scanning section 10' is fabricated in a small size, it is possible to adjust the optical path length from the section of deflection by the surface acoustic waves 12 to the read-out original 31 to a substantially large value, and to obtain a long main scanning width.

In order to increase the length of the turn-back optical path inside of the glass block 60 and to improve the efficiency of entry of the light 13 reflected by the end face 16c into the glass block 60, the oblique cutting angle of the end face 16c should preferably be adjusted so that the light 13 enters the glass block 60 at as small an incidence angle as possible. Also, it is necessary to adjust the length of the turn-back optical path so that the light 13 is emitted out of the glass block 60 before it is converged into the beam spot P.

Figure 6:
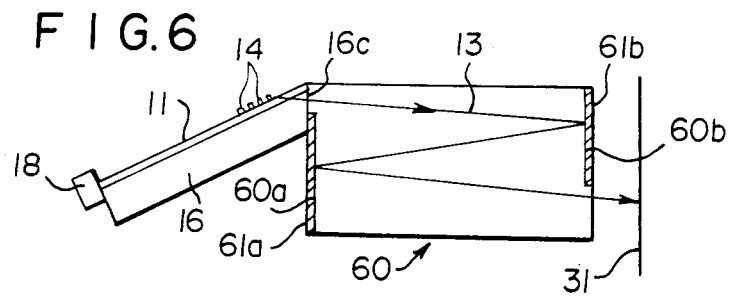
FIG. 6 is a side view showing a modified form of the embodiment of the light beam scanning read-out apparatus shown in FIG. 4, FIGS. 7 and 8 are a schematic perspective view and a side view showing an embodiment of the light beam scanning recording apparatus in accordance with the present invention.

FIG. 6 shows a modified form of the embodiment of the light beam scanning read-out apparatus in accordance with the present invention. In this case, the end face 16c of the substrate 16 is obliquely cut in the direction reverse to the cutting direction in the embodiment of FIG. 4, and the glass block 60 is joined to the end face 16c. The oblique cutting angle of the end face 16c is adjusted so that the light 13 enters the glass block 60 at as small an incidence angle as possible. It becomes thereby possible to make the light (first-order diffracted light component) 13 diffracted by the focusing grating coupler 14 efficiently enter the glass block 60, and to adjust the length of the turn-back optical path inside of the glass block 60 to a substantially large value.

Also in the apparatus of FIG. 6, the turn-back optical path is formed inside of the glass block 60, and the same effects as in the embodiment of FIG. 4 are obtained.

The light beam scanning read-out apparatus in accordance with the present invention may also be constituted to scan the read-out original with light, photoelectrically detecting light reflected by the read-out original or light passing therethrough, and reading out the original image.

Embodiments of the light beam scanning recording apparatus in accordance with the present invention will hereinbelow be described with reference to FIGS. 7, 8, 9 and 10. In FIGS. 7, 8, 9 and 10, similar elements are numbered with the same reference numerals with respect to FIGS. 1, 2, 3 and 4, except that reference numeral 31 denotes a light-sensitive material instead of the read-out original.

Figure 7:
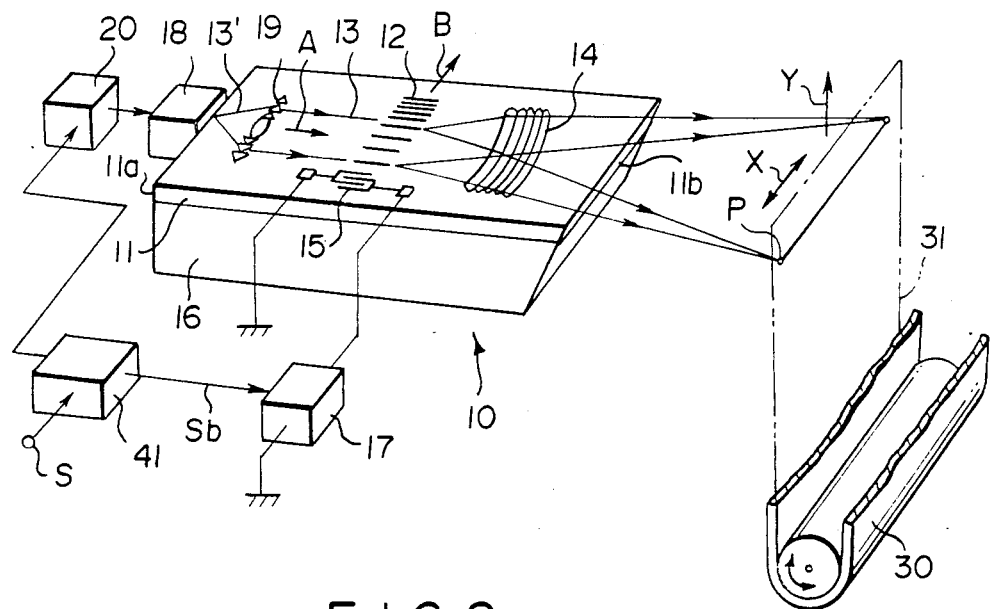
Figure 8:
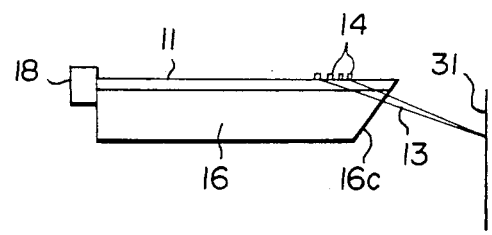

Referring to FIGS. 7 and 8, the light beam scanning recording apparatus is provided with a light beam scanning section 10, an endless belt device 30, and a modulation circuit 41. The light beam scanning section 10 is similar to the light beam scanning section 10 shown in FIG. 1, except that a laser drive circuit 20 for operating the semiconductor laser 18 is provided additionally.

When image recording is conducted with the light beam scanning recording apparatus shown in FIG. 7, the light-sensitive material 31 is conveyed by the endless belt device 30 in the direction as indicated by the arrow Y. The semiconductor laser 18 is operated by the laser drive circuit 20 so as to emit the divergent guided wave 13', and at the same time a pulsewise voltage the frequency of which changes continuously is applied from the drive circuit 17 to the interdigital transducer 15. The laser drive circuit 20 is controlled by the modulation circuit 41 and operates the semiconductor laser 18 so as to change the laser beam output, i.e. to change the intensity of the divergent guided wave 13', or to change the number of pulses or the pulse width in the case where the divergent guided wave 13' is emitted pulsewise, in accordance with an image signal S.

In the same manner as described with reference to FIG. 1, the guided optical wave 13 is converged by the focusing grating coupler 14 into the spot P, which scans the light-sensitive material 31 one-dimensionally in the direction as indicated by the arrow X in FIG. 7. In this embodiment, since the guided optical wave 13, i.e. the divergent guided wave 13', converged into the beam spot P is modulated in accordance with the image signal S, a continuous tone image which the image signal represents is recorded along one main scanning line on the light-sensitive material 31 by the beam spot P. At the same time, the endless belt device 30 is operated in synchronization with the scanning of the beam spot P, and the light-sensitive material 31 is thereby conveyed in the sub-scanning direction as indicated by the arrow Y. Accordingly, the image which the image signal S represents is two-dimensionally recorded on the light-sensitive material 31.

In order to synchronize the image signal S for one main scanning line with the main scanning conducted by the beam spot P, the timing of voltage application to the interdigital transducer 15 may be controlled by using a blanking signal Sb included in the image signal S as the trigger signal. It is also possible to synchronize the main scanning with the sub-scanning by controlling the timing of operation of the endless belt device 30 based on the blanking signal Sb.

Instead of directly modulating the semiconductor laser 18 with the image signal S, a laser beam of a predetermined intensity may be emitted by the semiconductor laser 18 and modulated by an external modulator such as an AOM (acousto-optic modulator) or an EOM (electro-optic modulator) positioned between the semiconductor laser 18 and the optical waveguide 11. Also, since the intensity of the light diffracted by the surface acoustic waves 12 may be changed by changing the level of the voltage applied to the interdigital transducer 15, it is also possible to achieve intensity modulation of the guided optical wave 13 by controlling the level of the applied voltage in accordance with the image signal S. Further, the modulation system is not limited to intensity modulation. Thus the laser beam may be emitted pulsewise, and the width or number of the pulses may be modulated in accordance with the image signal S. Also, though a continuous tone image is recorded on the light-sensitive material 31 in the aforesaid embodiment, it is also possible to record a black and white two-valued image by controlling the turning on-off of the semiconductor laser 18 in accordance with the image signal.

Figure 9:
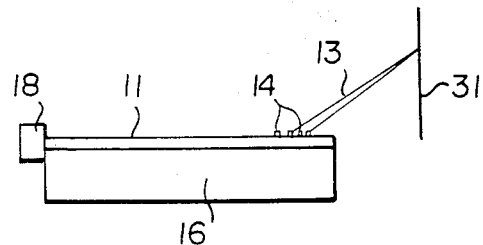
FIG. 9 is a schematic side view showing a modified form of the embodiment of the light beam scanning recording apparatus shown in FIG. 7.

As shown in FIG. 9, the embodiment of the light beam scanning recording apparatus shown in FIG. 7 may be modified as described above with reference to FIG. 3.

Figure 10:
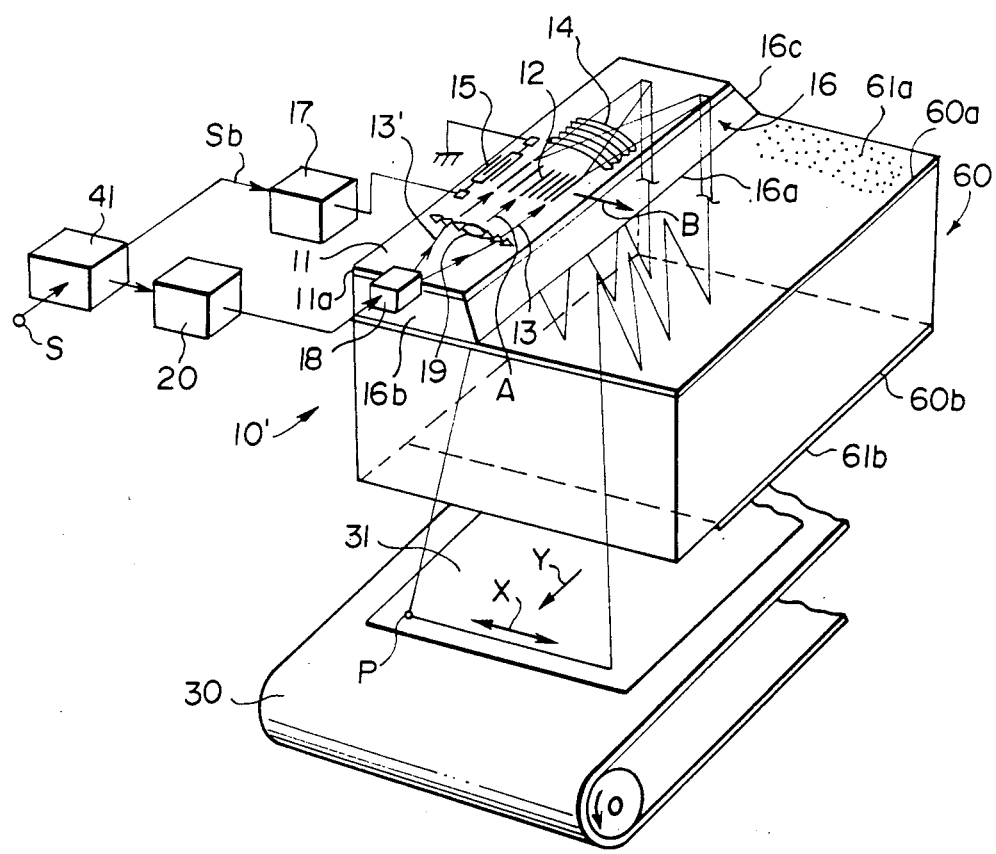
FIG. 10 is a schematic perspective view showing another embodiment of the light beam scanning recording apparatus in accordance with the present invention.

FIG. 10 shows another embodiment of the light beam scanning recording apparatus in accordance with the present invention, which has a side view as shown in FIG. 5. In FIG. 10, similar elements are numbered with the same reference numerals with respect to FIGS. 4 and 7. In this embodiment, a light beam scanning section 10' has the same configuration as the light beam scanning section 10' described above with reference to FIGS. 4 and 5. In this case, too, when the light-sensitive material 31 is provided at the position exposed to the converged beam spot P formed by the light 13 emitted out of the glass block 60 and moved in the sub-scanning direction as mentioned above, the light-sensitive material 31 is two-dimensionally scanned by the beam spot P, and the image which the image signal S represents is recorded on the light-sensitive material 31. Also, even though the light beam scanning section 10' is fabricated in a small size, it is possible to adjust the optical path length from the section of deflection by the surface acoustic waves 12 to the light-sensitive material 31 to a substantially large value, and to obtain a long main scanning width.

The embodiment of FIG. 10 may be modified as shown in FIG. 6.

In the aforesaid embodiments of the light beam scanning read-out apparatus and the light beam scanning recording apparatus in accordance with the present invention, the endless belt device 30 may be replaced by a rotatable drum or the like. The sub-scanning means may also be of the type moving the light beam scanning section 10 or 10' along the surface of the read-out original 31 or the light-sensitive material 31 which is stationary. In this case, since the light beam scanning section includes no mechanical operating section, it is easy to move. In the embodiments of the light beam scanning read-out apparatus, the photodetector is not limited to the photomultiplier 40, and any other photodetector such as a photo-diode array may be used.

Also, in the present invention, a plurality of the light beam scanning sections may be used to scan a plurality of light beams simultaneously. For example, it is possible to use three units of the light beam scanning section, and to conduct recording or read-out of a color image by combining R, G and B color filters or light sources emitting different color light.

It is claimed:
1. A light beam scanning read-out apparatus which comprises:
  (i) an optical waveguide formed of a material allowing propagation of surface acoustic waves therethrough,
  (ii) a light source for emitting light into said optical waveguide,
  (iii) an optical system for converting the guided optical wave advancing inside of said optical waveguide into a collimated optical guided wave,
  (iv) a means for generating the surface acoustic waves, which advance in a direction intersecting an optical path of said guided optical wave and deflect said guided optical wave, in said optical waveguide,
  (v) a drive circuit for operating said surface acoustic wave generating means so that said means generates the surface acoustic waves the frequency of which changes continuously,
  (vi) a focusing grating coupler formed on a surface of said optical waveguide for emitting said guided and deflected optical wave out of said optical waveguide and converging it at a space outside of said optical waveguide,
  (vii) a glass block provided with a light reflecting layer at each of two surfaces facing each other and joined with a substrate of said optical waveguide so that said light emitted out of said optical waveguide is reflected repeatedly between said two surfaces before said light arrives at the position of said converging,
  (viii) a sub-scanning means for moving a read-out original, which is positioned so that said converged light impinges upon said read-out original, with respect to said optical waveguide in a direction approximately normal to the scanning direction of said light by said deflection, and
  (ix) a photodetector for photoelectrically detecting light transmitting through said read-out original, light reflected by said read-out original, or light emitted by said read-out original when said converged light impinges upon said read-out original.

2. An apparatus as defined in claim 1 wherein said focusing grating coupler is formed to diffract said guided optical wave toward said substrate, said glass block s joined to a bottom surface of said substrate of said optical waveguide, and an end face of said substrate standing face to face with an end face thereof on a light input side is formed obliquely so as to totally reflect the light, which is diffracted by said focusing grating coupler, toward said glass block.

3. An apparatus as defined in claim 1 wherein said focusing grating coupler is formed to diffract said guided optical wave toward said substrate, an end face of said substrate standing face to face with an end face thereof on a light input side is formed obliquely, and said glass block is joined to said obliquely formed end face.

4. A light beam scanning recording apparatus which comprises:
  (i) an optical waveguide formed of a material allowing propagation of surface acoustic waves therethrough, (ii) a light source for emitting light into said optical waveguide, (iii) an optical system for converting the guided optical wave advancing inside of said optical waveguide into a collimated optical guided wave, (iv) a means for generating the surface acoustic waves, which advance in a direction intersecting an optical path of said guided optical wave and deflect said guided optical wave, in said optical waveguide, (v) a drive circuit for operating said surface acoustic wave generating means so that said means generates the surface acoustic waves the frequency of which changes continuously, (vi) a focusing grating coupler formed on a surface of said optical waveguide for emitting said guided and deflected optical wave out of said optical waveguide and converging it at a space outside of said optical waveguide, (vii) a glass block provided with a light reflecting layer at each of two surfaces facing each other and joined with a substrate of said optical waveguide so that said light emitted out of said optical waveguide is reflected repeatedly between said two surfaces before said light arrives at the position of said converging, (viii) a sub-scanning means for moving a light-sensitive material, which is positioned so that said converged light impinges upon said light-sensitive material, with respect to said optical waveguide in a direction approximately normal to the scanning direction of said light by said deflection, and (ix) a modulation means for modulating said guided optical wave in accordance with an image signal.

5. An apparatus as defined in claim 4 wherein said focusing grating coupler is formed to diffract said guided optical wave toward said substrate, said glass block is joined to a bottom surface of said substrate of said optical waveguide, and an end face of said substrate standing face to face with an end face thereof on a light input side is formed obliquely so as to totally reflect the light, which is diffracted by said focusing grating coupler, toward said glass block.

6. An apparatus as defined in claim 4 wherein said focusing grating coupler is formed to diffract said guided optical wave toward said substrate, an end face of said substrate standing face to face with an end face thereof on a light input side is formed obliquely, and said glass block is joined to said obliquely formed end face.

* * * * *